(12) United States Patent
Munksoe

(10) Patent No.: US 7,934,576 B2
(45) Date of Patent: May 3, 2011

(54) BICYCLE FRAME WITH INTEGRATED AND DETACHABLE BATTERY

(75) Inventor: Lars Munksoe, Silkeborg (DK)

(73) Assignee: Protanium B.V., Apeldoorn (NL)

( * ) Notice: Subject to any disclaimer, the term of this patent is extended or adjusted under 35 U.S.C. 154(b) by 0 days.

(21) Appl. No.: 12/530,380

(22) PCT Filed: Mar. 8, 2008

(86) PCT No.: PCT/DK2008/000097
§ 371 (c)(1),
(2), (4) Date: Jan. 22, 2010

(87) PCT Pub. No.: WO2008/106976
PCT Pub. Date: Sep. 12, 2008

(65) Prior Publication Data
US 2010/0133778 A1   Jun. 3, 2010

(30) Foreign Application Priority Data
Mar. 8, 2007   (DK) ................... 2007 00358

(51) Int. Cl.
*B62K 11/02* (2006.01)
(52) U.S. Cl. .............. 180/220; 180/65.1; 180/68.5
(58) Field of Classification Search .......... 180/220, 180/65.1, 65.21, 68.5, 214, 216, 281.1
See application file for complete search history.

(56) References Cited

U.S. PATENT DOCUMENTS

| | | | | |
|---|---|---|---|---|
| 5,798,702 A | * | 8/1998 | Okamoto et al. | 340/636.1 |
| 7,210,548 B2 | * | 5/2007 | Yonehana et al. | 180/68.5 |
| 2004/0163870 A1 | * | 8/2004 | Liao et al. | 180/220 |
| 2005/0029033 A1 | * | 2/2005 | Rip et al. | 180/220 |
| 2005/0092538 A1 | * | 5/2005 | Baldwin et al. | 180/220 |
| 2005/0217910 A1 | * | 10/2005 | Yonehana et al. | 180/68.5 |
| 2006/0000655 A1 | * | 1/2006 | Schless | 180/220 |

FOREIGN PATENT DOCUMENTS

| | | |
|---|---|---|
| DE | 196 40 248 A1 | 10/1997 |
| DE | 200 12 972 U1 | 9/2000 |
| EP | 0 794 113 A2 | 9/1997 |
| FR | 2 276 980 A | 1/1976 |
| WO | 03/022671 A2 | 9/2002 |

* cited by examiner

*Primary Examiner* — Joanne Silbermann
*Assistant Examiner* — Tashiana Adams
(74) *Attorney, Agent, or Firm* — Roberts Mlotkowski Safran & Cole, P.C.; David S. Safran

(57) ABSTRACT

The present invention concerns a bicycle frame, including a number of frame elements, preferably tubes, where the frame elements are interconnected and constitute a construction with so great rigidity that the cycle frame does not change its geometrical shape under usual load, where an electric battery system is at least partly embedded in the frame, including at least one battery pack for storing electric energy for use in connection with equipment, such as comfort equipment and/or safety equipment on a bicycle, including an electric auxiliary motor, where the part of the frame adapted to mounting a battery pack is constituted by a hollow section, the hollow section being a multiple chamber section, where a battery pack is predominantly arranged in a cutout in the multiple chamber section so that at least one chamber in the multiple chamber section is substantially intact. Thus is obtained a cycle frame with a cutout for a battery pack, where the frame has great rigidity.

10 Claims, 4 Drawing Sheets

BICYCLE FRAME WITH INTEGRATED AND DETACHABLE BATTERY

FIELD OF THE INVENTION

Figure 1:
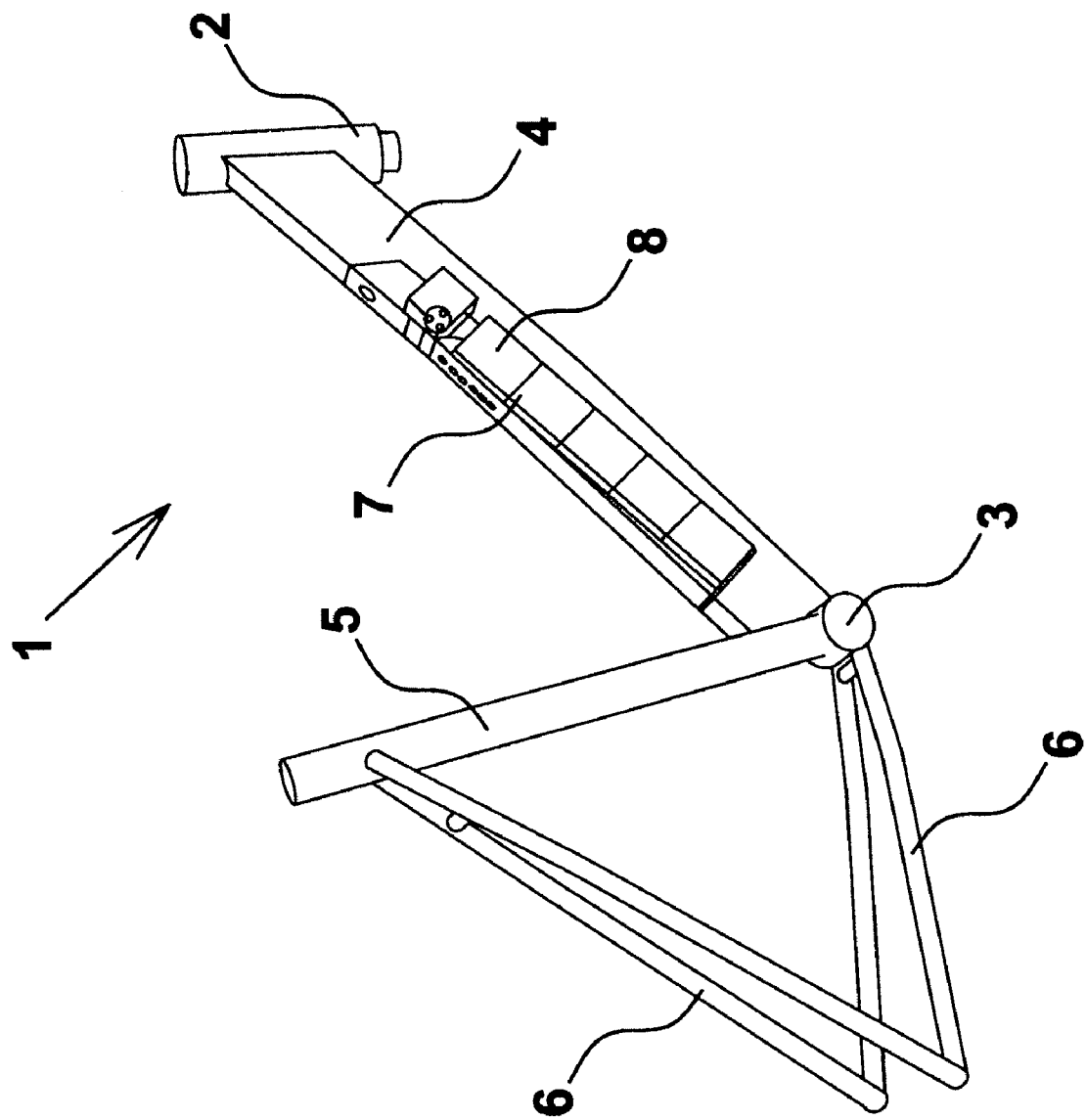

The present invention concerns a bicycle frame, including a number of frame elements, preferably tubes, where the frame elements are interconnected and constitute a construction with so great rigidity that the cycle frame does not change its geometrical shape under usual load, where an electric battery system is at least partly embedded in the frame, including at least one battery pack for storing electric energy for use in connection with equipment, such as comfort equipment and/or safety equipment on a bicycle, including an electric auxiliary motor.

DESCRIPTION OF PRIOR ART

It is commonly known to use battery systems on bicycles for e.g. lamps, but in recent years there is another product which has quietly entered the market, namely bicycles with electric auxiliary motors. These bicycles are provided with an electric motor assisting the cyclist so that less muscular power is to be used for treading the pedals of the bicycle. These bicycles are typically provided with battery systems made up of one or more battery packages which may be disposed at various points on the bicycle. This type of bicycle is not new but has, as mentioned, existed for a number of years, but due to the weight and capacity of batteries bicycles with auxiliary motors have not been particularly attractive as a substitution for a common bicycle. Modern battery technology has, however, made it more attractive than previously, but the fact is still that relatively large and cumbersome battery packages are provided on something which reminds of a usual bicycle.

That a bicycle with an electric auxiliary motor is not essentially different in design from a common bicycle has appeared to be a great wish on the part of the consumers, who want a discreet bicycle, and not the least a bicycle equipped with auxiliary motor without substantially increasing the weight of it.

In order to meet the consumers' desire for a discreet solution, there are innumerable variants where the battery package or packages are disposed integrated in the frame, either in compartments adapted for the battery packages or directly as a frame part which is to be dismounted for charging or replacement. As bicycles are often parked at train stations and on the street, it is furthermore important that the battery package can be readily dismounted and carried by the consumer, as it otherwise may easily be removed from the bicycle without the consent of the user, or for charging when the user is not using the bicycle.

It is the purpose of the invention to indicate a cycle frame with integrated and detachable battery, where the bicycle can be operated with as well as without a mounted battery. Furthermore, it is the purpose to indicate a solution where the battery is mainly built into the frame from where it may readily be dismounted for charging, replacement or for preventing theft.

DESCRIPTION OF THE INVENTION

The invention concerns a bicycle frame as mentioned in the introduction and as specified in the preamble of claim 1, where the part of the frame adapted to mounting a battery pack is constituted by a hollow section, the hollow section being a multiple chamber section, where a battery pack is predominantly arranged in a cutout in the multiple chamber section so that at least one chamber in the multiple chamber section is substantially intact.

By a cycle frame according to the invention is achieved a rigid frame construction, as at least the hollow section in which a battery pack is arranged is not weakened by a cutout, as at least one of the chambers in the multiple chamber section retains a strength corresponding to the normal strength of the frame part in question. Typically, the battery pack is provided in the lower tube of the cycle frame which is much weakened when using a normal single chamber section in that a cutout is made for a battery pack. However, it is possible to make a frame part made of a single chamber section so that a battery pack constitutes an integrated and structural part when mounted. However, this is not particularly expedient, partly because the bicycle cannot be used without battery pack and partly because such a design will imply a complicated mounting and dismounting of the battery pack. Also, it is required that the battery pack has a strength so that it may form a part of the load-bearing structure.

In a cycle frame according to the invention where the frame part in which the battery pack is mounted, typically in the lower tube or in the saddle post tube, is made of a multiple chamber section, one or more cutouts can be made in the section without the section loosing so much rigidity as to influence the load capacity of the cycle frame. This is due to the cutout only being made in one or more, but not all, chambers of the section. If a double chamber section is thus made where the cutout only is in one chamber, great rigidity is maintained in the section, as there is still one closed chamber which in principle acts as a common hollow section.

A cycle frame may thus advantageously be adapted for mounting a battery pack in a frame element extending from crank to crown tube, or the frame may be adapted for mounting a battery pack in a frame element extending from crank to saddle, where the frame element in which the battery pack is arranged is a multiple chamber section.

In such a cutout in a cycle frame according to the invention, a cutout can be made in at least one chamber in the multiple chamber section, in which cutout means may be arranged for receiving and securing at least one battery pack. These means may e.g. be projections that fit together with corresponding projections on a battery pack which then may be fastened in the cutout in the frame. This positioning and retention can be made in many ways, but a solution where the battery pack may be released rapidly and easily by actuating a button or lever is preferred, so that easy and rapid mounting and dismounting may occur with a kind of quick release coupling. It is thus easy to dismount a battery pack for recharging or for carrying it, whereby theft may be avoided, or for storing it warm until next time the bicycle and the battery pack are to be used, whereby the discharge of the battery pack will not be so large.

In a variant of a cycle frame according to the invention, in at least one chamber of the multiple chamber section means may be arranged for controlling and regulating an electric auxiliary motor. These means are commonly called a "controller" with the function of regulating how much power to be supplied to the electric auxiliary motor. Such a controller is advantageously provided in a cycle frame as heat is deposited in the unit and which is to be dissipated. The cycle frame may here be used as a cooling surface if the controller is disposed with a suitable contact face onto the frame.

A preferred variant of a cycle frame according to the invention may be constructed so that the cutout is with terminals which at the mounting a battery pack may interact with corresponding terminals of the latter. Hereby is achieved a ready mounting of a battery pack, as wiring or similar between battery pack and cycle frame does not have to be fitted.

For charging a battery pack remaining in the mounted state on the cycle frame, there may be arranged a connecting point, preferably close to the battery pack, where the point may be used for charging the battery pack. Thus it is possible to charge the battery pack in e.g. a bicycle shed or the like.

In a variant of the invention there may be arranged a connecting point which may be used as power outlet from where external electric equipment can be supplied. Lamps and other electric apparatuses, such as music players, mobile phones or other equipment, may thus be connected, and which are supplied as well as charged in this way.

The battery pack may advantageously be provided with battery cells of lithium polymer type. Such lithium polymer battery cells have a capacity of up to three times the capacity of nickel-cadmium battery cells and have a very low degree of self-discharging. Of course, other suitable types of battery cells may be used if desired. Furthermore, the frame or battery pack may be provided with a capacity indicator on which may be read an expression of how much energy there is left in the battery pack.

A bicycle frame according to the invention includes at least one battery pack for storing electric energy for use in connection with equipment, such as comfort equipment and/or safety equipment on a bicycle. The new feature of a bicycle frame according to the invention is that the exterior of the battery pack is shaped as a part of the cycle frame, where the battery pack at least consists of a number of interconnected battery cells and at least one terminal for connecting to equipment and/or charging the battery. By this solution it is possible to design a bicycle with sufficiently large battery pack, where the battery pack is disposed integrated in the frame in a very discreet way.

It is thus possible to make a bicycle with an electric auxiliary motor, where the battery pack is almost invisibly hidden in the cycle frame, and where the bicycle may also be used without mounted battery pack, without deforming the frame.

By such a bicycle frame there is achieved a discreet solution to the positioning of a battery pack on a bicycle, and at the same time is achieved possibility of having a battery package with suitable size without having to mount large and cumbersome battery packages at different places on the bicycle.

A particular version of a battery package according to the invention is with a carrying handle. This provides the user the possibility of transporting the battery package for charging or just preventing that it may be stolen while the bicycle is standing parked.

SHORT DESCRIPTION OF THE DRAWING

Figure 2:
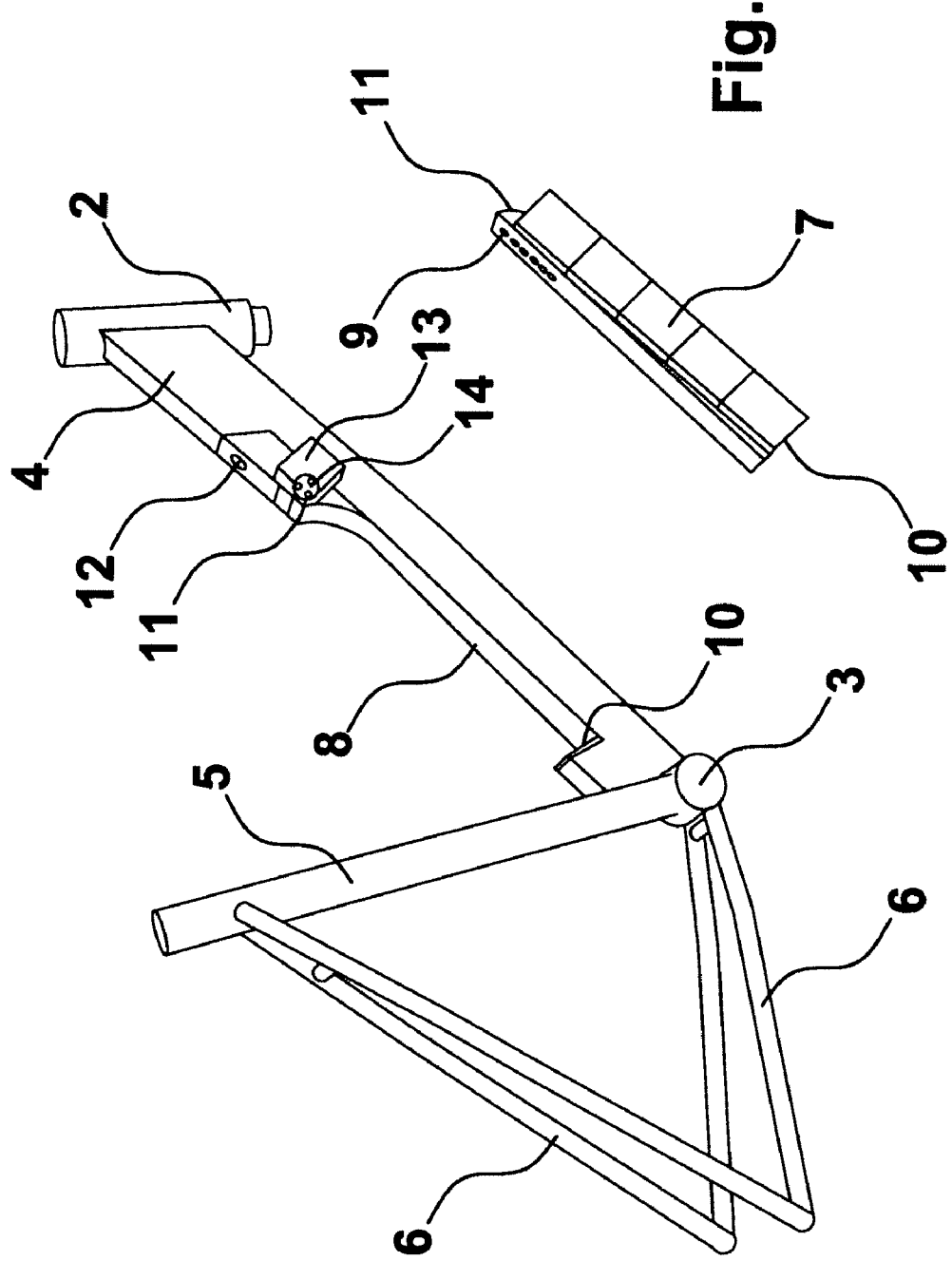
Figure 3:
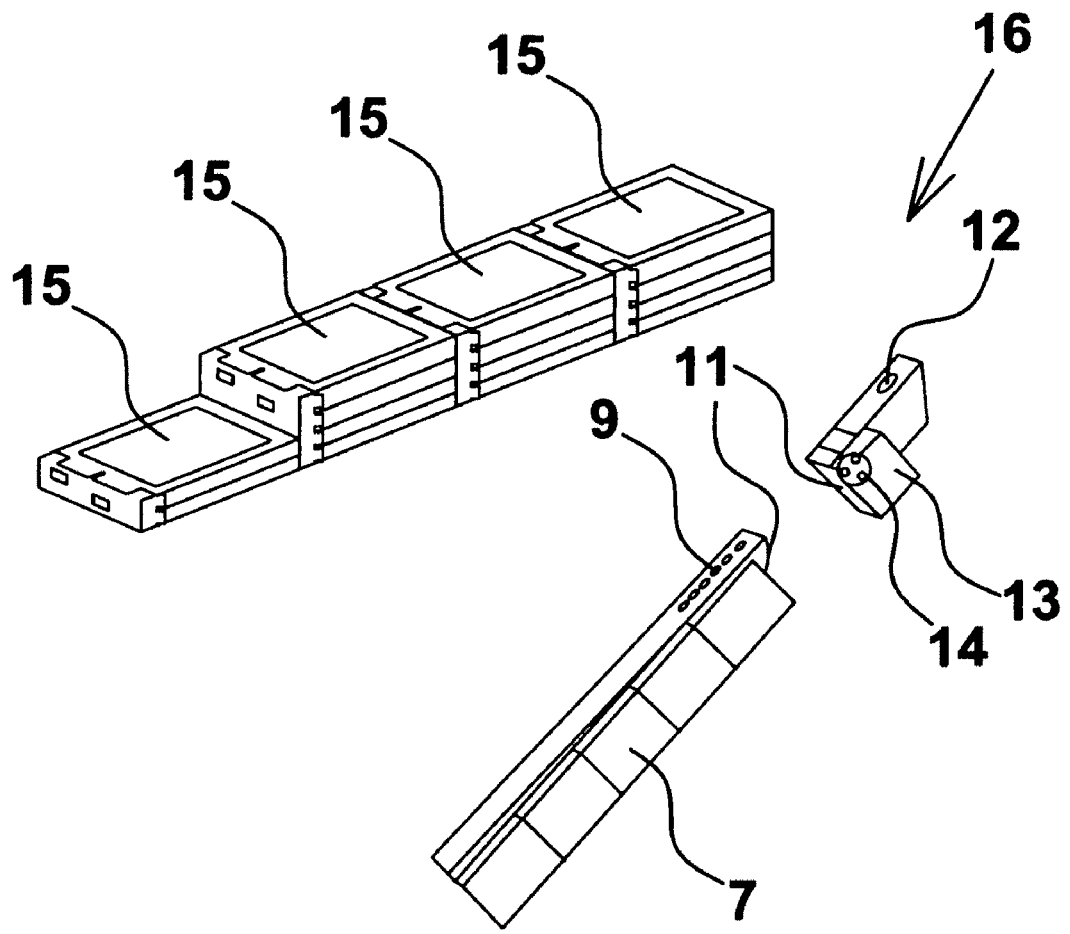
Figure 4:
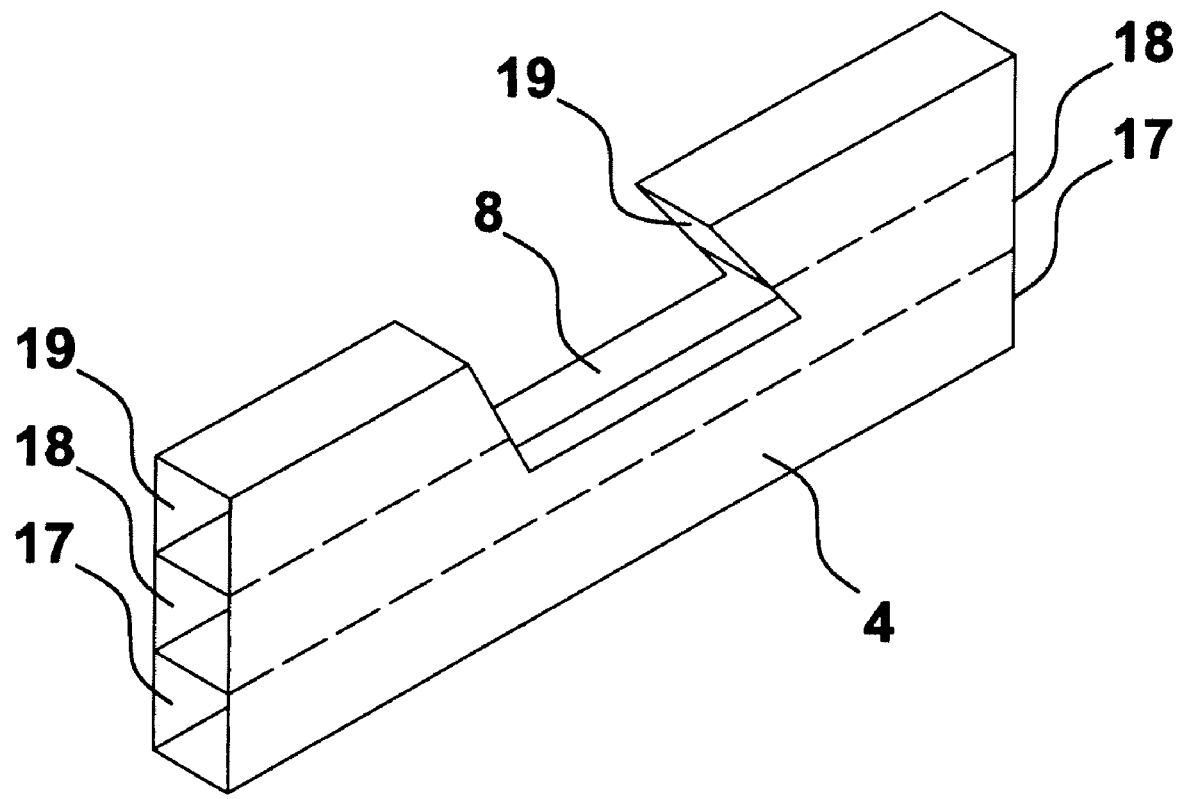

The invention is described in more detail with reference to the drawing, where:
FIG. 1 shows a bicycle frame fitted with a battery pack;
FIG. 2 shows a bicycle frame with detached battery pack;
FIG. 3 shows the design of a battery pack;
FIG. 4 shows an example of a multiple chamber section.

DETAILED DESCRIPTION OF THE INVENTION

In FIG. 1 appears a bicycle frame 1, consisting of a crown tube 2 and a crank tube 3 between which a lower tube 4 is located. The saddle post tube 5 extends from the crank tube 3 and upwards, and the back fork 6 is mounted on saddle post tube 5 and crank tube 3, respectively. The shown frame is a classic frame for a lady's bicycle, where a frame for a classic men's bicycle will typically be with a top tube mounted between crown tube 2 and saddle post tube 5. In the shown frame 1 there is mounted a battery pack 7 in the lower tube 4 in a cutout 8. This cutout 8 and the battery pack 7 are formed so that on the face of it, the lower tube 4 appears as a common lower tube 4. Thus we are speaking of a discreet solution for positioning the battery pack 7.

In FIG. 2, a frame 1 for a bicycle is also seen, but here shown with a dismounted battery pack 7. On the battery pack 7 there is provided a capacity indicator 9, here consisting of six light diodes. In the cutout 8 in the lower tube 4 as well as on the battery pack 7 there are interacting means 10 for exact disposition of the battery pack 7, and there are securing or locking means 11 for securing the battery pack 7. By dismounting the battery pack, a release button 12 is actuated which is here disposed on the lower tube 4, but which may in principle be disposed on the battery pack 7 itself. Internally of the lower tube 4 there is provided a so-called controller 13, and a connecting point 14 is provided for charging or supplying other electric equipment.

FIG. 3 shows how a battery pack 7 can be made up of a number of battery cells 15. On the Figure also appears the unit 16 disposed in the lower tube 4, to which the battery pack 7 is fixed by fastening with the locking means 11, and also where the release button 12, the controller 13 and the connecting point 14 are disposed. By incorporating these elements into a single unit 16, a rapid and simple mounting is achieved. This unit 16 may advantageously be fastened in the lower tube 4 with glue, screws, clips or the like.

In FIG. 4 appears an example of a lower tube 4 where it is clearly seen that the lower tube 4 is a so-called multiple chamber section. The shown lower tube 4 is with three chambers 17, 18 and 19. As it appears from the Figure, a cutout 8 is made in the lower tube 4. This cutout 8 extends longitudinally of the lower tube and through two of the chambers 17, 18 and 19, namely through chamber 18 and chamber 19. This use of a multiple chamber section means that irrespectively of a cutout 8, great rigidity is maintained in the lower tube 4.

The invention claimed is:

1. A bicycle frame, including a number of frame elements, preferably tubes, where the frame elements are interconnected and constitute a construction with so great rigidity that the cycle frame does not change its geometrical shape under usual load, where an electric battery system is at least partly embedded in the frame, including at least one battery pack for storing electric energy for use in connection with equipment, such as comfort equipment and/or safety equipment on a bicycle, including an electric auxiliary motor, wherein the part of the frame adapted to mounting a battery pack is constituted by a hollow section, the hollow section being a multiple chamber section, where a battery pack is predominantly arranged in a cutout in the multiple chamber section so that at least one chamber in the multiple chamber section is substantially intact.

2. A bicycle frame according to claim 1, wherein the frame is adapted for mounting a battery pack in a frame element extending from crank to crown tube, where this frame element is a multiple chamber section.

3. A bicycle frame according to claim 1, wherein the frame is adapted for mounting a battery pack in a frame element extending from crank to saddle, where this frame element is a multiple chamber section.

4. A bicycle frame according to claim 1, wherein a cutout is made in at least one chamber in the multiple chamber section, and that means are arranged for receiving and securing at least one battery pack.

5. A bicycle frame according to claim 1, wherein in at least one chamber of the multiple chamber section, means are arranged for controlling and regulating an electric auxiliary motor.

6. A bicycle frame according to claim 1, wherein the cutout is with terminals which by mounting a battery pack interact with corresponding terminals of the latter.

7. A bicycle frame according to claim 1, wherein there is arranged a connecting point, preferably close to the battery pack, where the point may be used for charging the battery pack.

8. A bicycle frame according to claim 1, wherein there is arranged a connecting point which may be used as power outlet from where external electric equipment may be supplied.

9. A bicycle frame according to claim 1, wherein the battery pack is provided with battery cells of lithium polymer type.

10. A bicycle frame according to claim 1, wherein the battery pack is provided with a capacity indicator.

* * * * *